US007844409B2

(12) United States Patent
Johnson et al.

(10) Patent No.: US 7,844,409 B2
(45) Date of Patent: Nov. 30, 2010

(54) FILTERING OF METER READING DATA

(75) Inventors: Matthew Johnson, Spokane, WA (US); Mark Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 130 days.

(21) Appl. No.: 12/362,451

(22) Filed: Jan. 29, 2009

(65) Prior Publication Data
US 2010/0188259 A1    Jul. 29, 2010

(51) Int. Cl.
*G08C 15/06* (2006.01)

(52) U.S. Cl. .............................. 702/62; 702/57; 702/61; 702/65; 702/188; 340/870.02; 340/870.03; 340/870.28; 340/505

(58) Field of Classification Search .............. 702/57, 702/61, 62, 65, 188; 340/870.02, 870.03, 340/870.28, 505; 370/312, 330, 346; 709/217, 709/219; 455/105
See application file for complete search history.

(56) References Cited

U.S. PATENT DOCUMENTS

| | | | | |
|---|---|---|---|---|
| 4,614,945 | A * | 9/1986 | Brunius et al. | 340/870.03 |
| 5,719,564 | A * | 2/1998 | Sears | 340/870.02 |
| 6,100,817 | A * | 8/2000 | Mason et al. | 340/870.02 |
| 6,946,972 | B2 * | 9/2005 | Mueller et al. | 340/870.02 |
| 7,089,089 | B2 * | 8/2006 | Cumming et al. | 700/295 |
| 7,312,721 | B2 * | 12/2007 | Mason et al. | 340/870.02 |
| 7,362,236 | B2 * | 4/2008 | Hoiness | 340/870.02 |
| 2002/0145537 | A1 * | 10/2002 | Mueller et al. | 340/870.02 |
| 2003/0128134 | A1 * | 7/2003 | Fierro et al. | 340/870.02 |
| 2005/0237221 | A1 * | 10/2005 | Brian et al. | 340/870.02 |
| 2005/0237959 | A1 * | 10/2005 | Osterloh et al. | 370/310 |
| 2006/0066457 | A1 * | 3/2006 | Mueller et al. | 340/870.02 |
| 2006/0119488 | A1 * | 6/2006 | Hoiness | 340/870.02 |
| 2007/0063867 | A1 * | 3/2007 | Fuller et al. | 340/870.02 |
| 2007/0236362 | A1 * | 10/2007 | Brian et al. | 340/870.02 |
| 2008/0158007 | A1 * | 7/2008 | Nagy et al. | 340/870.03 |
| 2008/0272933 | A1 * | 11/2008 | Cahill-O'Brien et al. | 340/870.02 |

* cited by examiner

*Primary Examiner*—Carol S Tsai
(74) *Attorney, Agent, or Firm*—Dority & Manning, P.A.

(57) ABSTRACT

Packet formats and associated metering infrastructure for filtering meter reading data that is being transmitted by utility meters are disclosed. In one embodiment, a method suitable for being implemented in a metering environment is provided that filters meter reading data being received by multiple collectors. Specifically, the method includes ranking the relative ability of the plurality of collectors to capture transmissions from the same utility meter. Based on the relative ranking, at least one collector from the plurality of collectors is identified that will be configured to disregard transmissions that originate from the utility meter. Then, the method provides the collector with a read list for differentiating between transmissions containing meter reading data that will be forwarded to a utility service provider from transmissions that originate from the utility meter.

16 Claims, 6 Drawing Sheets

| FIELD # | BYTES | VALUE | DESCRIPTION |
|---|---|---|---|
| 1 | 2 | 16A3 | Frame Sync |
| 2 | 1 | 1F | Protocol ID |
| 3 | 2 | 29EA | Length |
| 4 | 1 | 0F | Message Number |
| 5 | 1 | 1C | Endpoint Type |
| 6 | 4 | xxxxxxxx | Endpoint Serial Number |
| 7 | 1 | 06 | Decode type |
| 8 | 3 | xxxxxx | Multiplier |
| 9 | 4 | xxxxxxxx | Current Consumption |
| 10 | 16 | xx...xx | Hour 1 – 8 Intervals |
| 11 | 1 | xx | Sequence Counter |
| 12 | 2 | xxxx | Time Since Midnight |
| 13 | 1 | xx | Tilt Counter |
| 14 | 1 | xx | Tamper Counter |
| 15 | 2 | xxxx | Network Configuration Bytes |
| 16 | 4 | xxxxxxxx | Packet CRC (32 bit) |

*Fig.2A.*

| FIELD # | BYTES | VALUE | DESCRIPTION |
|---|---|---|---|
| 1 | 2 | 16A3 | Frame Sync |
| 2 | 1 | 1F | Protocol ID |
| 3 | 2 | 147B | Length |
| 4 | 1 | 16 | Message Number |
| 5 | 1 | 1C | Endpoint Type |
| 6 | 4 | xxxxxxxx | Endpoint Serial Number |
| 7 | 4 | xxxxxxxx | Current Consumption |
| 8 | 2 | xxxx | Time Since Midnight |
| 9 | 1 | xx | Tilt Counter |
| 10 | 1 | xx | Tamper Counter |
| 11 | 2 | xxxx | Network Configuration Bytes |
| 12 | 4 | xxxxxx | Packet CRC (32 bit) |

*Fig.2B.*

FILTERING OF METER READING DATA

BACKGROUND

Utility meters may be configured to perform wireless transmission of meter readings. For example, an Encoder Receiver Transmitter ("ERT") may be implemented within a utility meter in order to encode and transmit data utilizing radio-based communications. Utility meters configured to report meter readings in this way are commercially available and increasingly being installed in homes, businesses, and the like. At installation or subsequently, a utility service provider may register and begin obtaining meter readings using a collection system such as fixed network, mobile collection unit, etc.

Transmissions of meter readings are typically encoded as "packetized" data. In the present application, the term "packet" is intended to encompass packets, frames, cells or any other method used to encapsulate data for transmission between remote devices. As understood in the art, packets typically maintain a plurality of fields as well as a preamble and trailer to identify the beginning and end of the packet. For example, existing packet formats typically include a time stamp field identifying the time maintained by the "clock" of a utility meter. To extend the operating life of a battery or other power source, techniques and devices that minimize power consumption are utilized. As a result, a low-power clock having at least some tendency to "drift" from an actual time may be employed by utility meters. Unfortunately, existing packet formats and related systems are not readily able to measure inaccuracies in the time maintained by utility meters.

A collection system employed by a utility service provider may include Cell Control Units ("CCU") that receive meter readings within a geographic coverage area. To provide fault-tolerance and ensure that meter readings are collected, CCUs will typically maintain overlapping coverage areas. As a result, meter readings originating from a utility meter may be received by multiple CCUs with each being forwarded to a utility service provider. During normal operations, this fault tolerance may result in excessive network resources being consumed since the same data is forwarded by multiple CCUs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Packet formats and associated metering infrastructure for filtering meter reading data that is being transmitted by utility meters are disclosed. In one embodiment, a method suitable for being implemented in a metering environment is provided that filters meter reading data being received by multiple collectors. Generally, the method includes ranking the relative ability of the plurality of collectors to capture transmissions from the same utility meter. Based on the relative ranking, at least one collector from the plurality of collectors is identified that will be configured to disregard transmissions that originate from the utility meter. Then, the method provides the collector with a read list for differentiating between transmissions containing meter reading data that will be forwarded to a utility service provider from transmissions that originate from the utility meter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 2A-2B are block diagrams illustrating packet formats suitable for illustrating aspects of the disclosed subject matter;

DETAILED DESCRIPTION

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following description first provides an overview of a metering environment in which the disclosed subject matter may be implemented. Then, exemplary routines that provide an improved metering infrastructure are described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Figure 1:
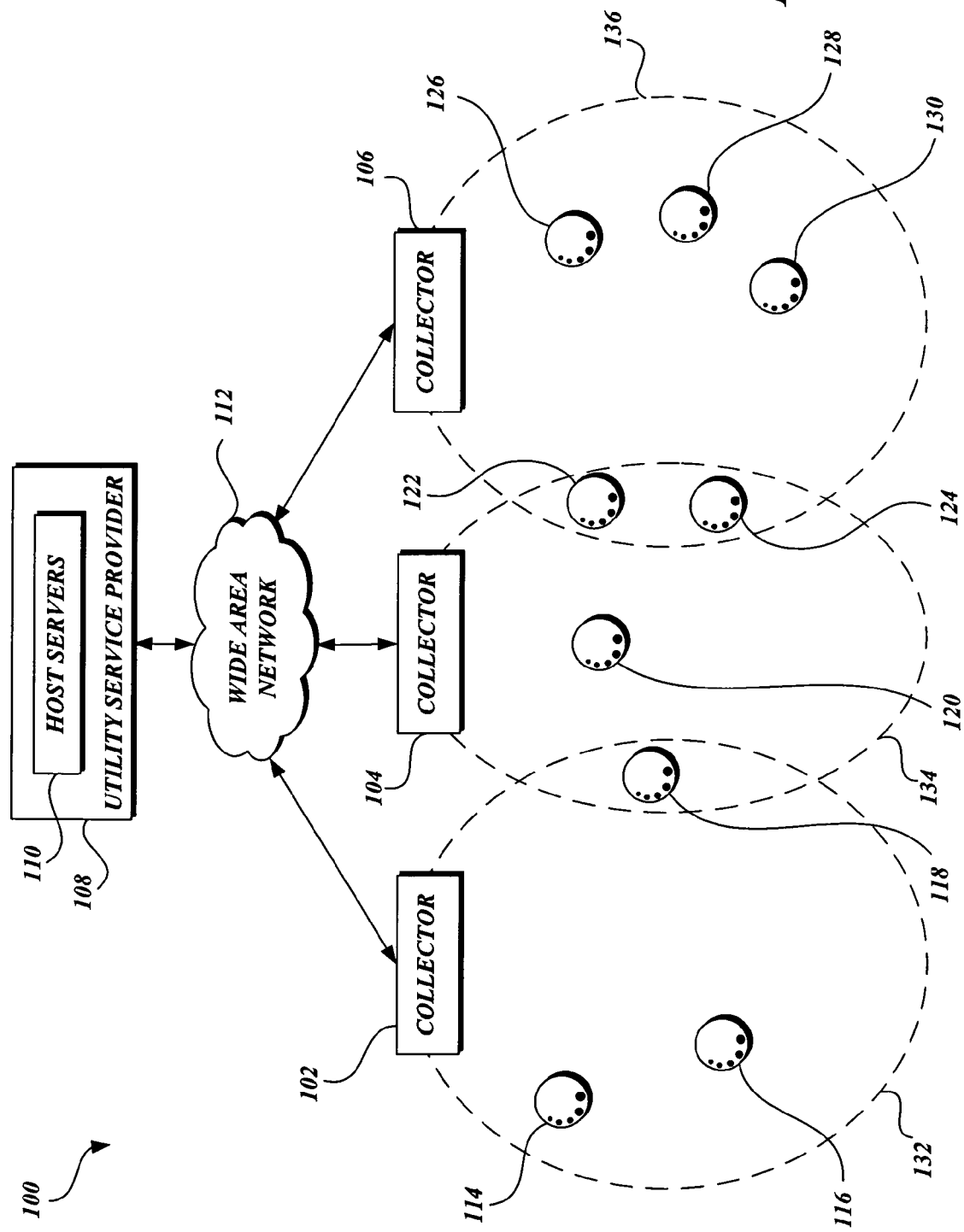
FIG. 1 is a block diagram depicting an illustrative metering environment suitable for collecting data from utility meters.

Referring to FIG. 1, the following is intended to provide a general overview of a metering environment 100 in which the disclosed subject matter may be implemented. Specifically, the metering environment 100 depicted in FIG. 1 includes a plurality of collectors (e.g., CCUs) 102, 104, and 106 configured to collect data from utility meters. Those skilled in the art and others will recognize that the collectors 102-106 may be one of many types of devices within a fixed network used to collect and forward meter reading data to the utility service provider 108. In this regard, a fixed network may be comprised of additional components not illustrated in FIG. 1 including, but not limited to, antennas, towers, repeaters or any other device used to transmit meter reading data. Moreover, while the collector is described herein as being a device in a fixed network, those skilled in the art and others will recognize that this is merely exemplary as a collector may be a standalone device or a component of a different type of collection system. In the embodiment depicted in FIG. 1, the collectors 102-106 are configured to forward meter reading data to host servers 110 over a wide area network 112, which may be implemented utilizing TCP/IP protocols (e.g., Internet), GPRS or other cellular-based protocols, Ethernet, WiFi, Broadband Over Power Line, and combinations thereof, etc. The host servers 110 maintain application logic for storing and analyzing meter reading data. As described in further detail below, the host servers 110 are configured to analyze a sample of meter readings and rank the collectors 102-106 in their ability to communicate with a particular utility meter.

As illustrated in FIG. 1, the collector 102 is configured to communicate with a plurality of utility meters 114, 116, and 118 that are located within an associated coverage area 132. Similarly, the collectors 104 and 106 are configured to communicate with the utility meters 118-130 within their associated coverage areas 134 and 136, respectively. As known to those skilled in the art, the utility meters 114-130 may be gas meters, water meters, electric meters, or any other device configured with an endpoint device for transmitting and/or receiving wired or wireless meter reading data. In this regard, each of the utility meters 114-130 is configured to perform communications with collectors utilizing automated meter reading protocols. In this regard, the utility meters 114-130 transmit data either periodically ("bubble-up"), in response to a wake-up signal, or in a combination/hybrid configuration.

Generally described, the collectors 102-106 serve as the interface for collecting meter reading data from devices that utilize automated meter reading protocols (e.g., the utility meters 114-130). However, wireless communications are typically less reliable than communications performed over wired networks. As such, interference sources may exist that prevent meter reading data encoded as one or more packets from being successfully transmitted to a collector. To improve reliability, the utility meters 114-130 are typically configured to transmit the same meter reading data in multiple transmissions. Moreover, the coverage areas of the collectors 102-106 may overlap so that meter readings originating from the utility meters 118, 122, and 124 within overlapping coverage areas are received by multiple collectors. As a result, existing systems may cause an excessive amount of meter reading data to be forwarded to the utility service provider 108.

A packet format and associated metering infrastructure are provided for filtering meter reading data that is received by the collectors 102-106. Generally, a sample of unfiltered meter reading data is obtained and used to rank the ability of different collectors to communicate with the same utility meter. Collectors identified as being less reliable in collecting data for a particular utility meter may be re-configured to "drop" packets received from the utility meter. To facilitate the filtering, network configuration bytes within the packets transmitted by utility meters may be modified in a way that allows the collectors 102-106 to differentiate between packets that will be forwarded to a utility service provider from those that will be "dropped."

In another aspect, a packet format and associated metering infrastructure are provided for identifying and determining whether the "drift" in the time maintained by a utility meter 114-130 is more than a threshold level. As mentioned previously, a low-power clock having at least some tendency to drift from an actual time may be employed to maintain the time within a utility meter 114-130. A substantial amount of drift could ultimately impact the accuracy in the meter reading data that is collected. In one embodiment, a packet format and related systems are provided for monitoring the accuracy of the time maintained by a utility meter 114-130.

The discussion provided above with reference to FIG. 1 is intended as a brief, general description of one metering environment 100 suitable for implementing various aspects of the disclosed subject matter. While the description above is made with reference to specific types of devices linked together through different interfaces, those skilled in the art will appreciate that the disclosed subject matter may be implemented in other contexts. In this regard, different types of devices and communication interfaces than those illustrated in FIG. 1 may be utilized.

For illustrative purposes and by way of example only, representative packets 200 and 250 suitable to illustrate aspects of the disclosed subject matter are depicted in FIGS. 2A-2B. In this regard, the packet 200 illustrated in FIG. 2A includes a plurality of rows ("fields") having entries organized within the BYTES 202, VALUE 204, and DESCRIPTION 206 columns. In this embodiment, the BYTES 202 column includes entries containing integers that identify the amount of data allocated to a particular field. The VALUE 204 column includes entries that identify a fixed or variable value for the data within the field of the packet. Similarly, the DESCRIPTION 206 column includes a string of characters that provides a human-readable description of the field. In accordance with one embodiment, the packet 200 includes fields that allow consumption data for particular intervals of time to be encapsulated and transmitted to a utility service provider. Accordingly, the packet 200 depicted in FIG. 2A is a packet format well-suited for utility meters capable of measuring the consumption of a utility service for specified time intervals.

Similar to FIG. 2A, the packet 250 depicted in FIG. 2B includes a plurality of fields having associated entries organized in the BYTES 252, VALUE 254, and DESCRIPTION 256 columns. The BYTES 252 column includes entries containing integers that identify the amount of data allocated to a particular field. Similar to FIG. 2A, the VALUE 254 and the DESCRIPTION 256 columns include entries identifying a value for the data in the field and human-readable description of a field, respectively. Those skilled in the art and others will recognize that packet size should be minimized when performing network communications. In accordance with one embodiment, the packet 250 depicted in FIG. 2B does not include fields for reporting intervals of consumption data. Accordingly, the packet 250 depicted in FIG. 2B is well-suited for utility meters that are not configured to report consumption data for specified time intervals.

As illustrated in FIGS. 2A-2B, the packets 200 and 250 include the network configuration bytes fields 208 and 258, respectively. As mentioned previously, meter reading data may be filtered to reduce the expenditure of network resources. In one embodiment, the network configuration bytes fields 208 and 258 are configurable and may be set to facilitate the filtering of meter reading data. Specifically, the value in the configuration bytes fields 208 and 258 may be set to a value that allows collectors to determine whether to "drop" a received packet or forward data from the packet to a utility service provider. In addition, the packets 200 and 250 include the time since midnight fields 210 and 260, respectively. As described in further detail below, the time since midnight fields 210 and 260 may be utilized to determine the accuracy of the time maintained by a utility meter. While the fields 210 and 260 report time since a particular fixed point, this should be construed as exemplary.

Those skilled in the art and others will recognize that attributes and format of the packets 200 and 250 illustrated in FIGS. 2A-2B are only illustrative. In this regard, entries within the fields of the packets 200 and 250 may be added/removed or otherwise modified in alternative embodiments. Accordingly, the packets 200 and 250 are only representative embodiments of how meter reading data may be encapsulated for transmission from a utility meter.

Now with reference to FIG. 3, an exemplary component architecture for a collector 102 also depicted in FIG. 1 will be described. Specifically, the collector 102 includes a processor 300, a memory 302, and a clock 304. In addition, the collector 102 includes a network interface 306 comprising components for communicating with other devices over the wide area network 112 (FIG. 1). As further depicted in FIG. 3, the collector 102 includes a radio-based communication system 308 for transmitting/receiving wireless communications with other radio-based devices (e.g., the utility meters 114-118).

Figure 3:
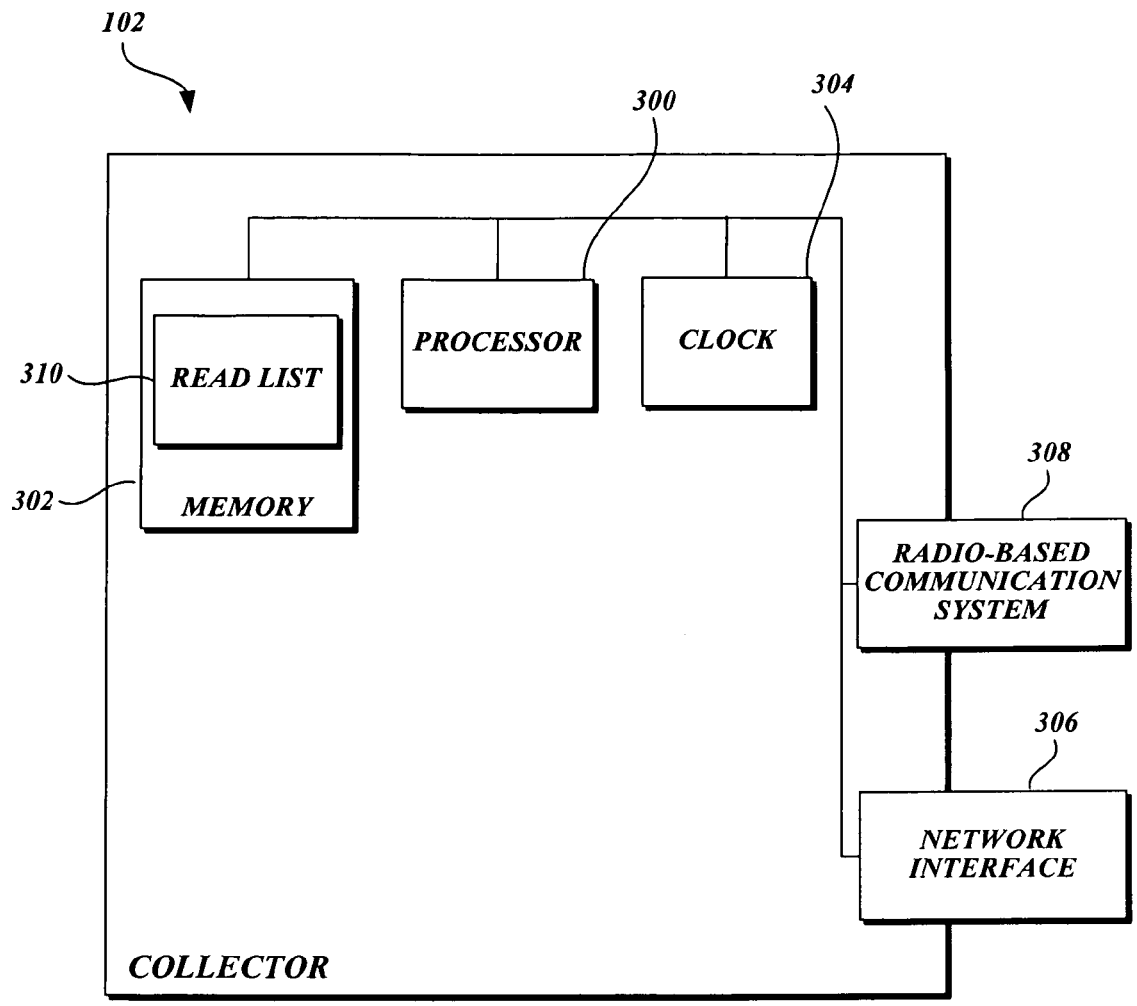
FIG. 3 is a block diagram illustrating components of a collector, such as a Cell Control Unit (CCU)

For ease of illustration, FIG. 3 does not depict other components such as transmitter and receiver circuitry, analog to digital converter, amplifier, power source, etc., which will typically be included with the radio-based communication system 308. However, since these and other components that may be included with the collector 102 are not relevant to the claimed subject matter they will not be described in detail here.

The memory 302 depicted in FIG. 3 is one example of computer-readable media suitable for storing data that is used to implement aspects of the disclosed subject matter. As used herein, the term "computer-readable media" includes volatile and non-volatile and removable and non-removable memory implemented in any method or technology capable of storing information, such as computer-readable instructions, data structures, program modules, or other data. In this regard, the memory 302 depicted in FIG. 3 is one example of a computer-readable media but other types of computer-readable media may be used.

In one embodiment, the processor 300 is configured to receive meter reading data (e.g., packets) from one or more utility meters utilizing the radio-based communication system 308. The received data is parsed and re-packaged into a structured format suitable for transmission over the wide area network 112 to the host servers 110. In this regard, data from a plurality of collectors may be aggregated in a data store maintained by the utility service provider 108. The aggregated data is analyzed to quantify and rank the ability of different collectors to communicate with a particular utility meter. Based on the ranking, a read list 310 is created and stored in the memory 302 that may be used to filter data received from different utility meters. In this regard, logic suitable to be executed by the processor 300 performs processing to determine whether received packets originate from a utility meter identified on the read list 310. When a packet originates from a utility meter on the read list 310, the meter reading data is parsed, re-packaged, and forwarded to the utility service provider 108. In contrast, packets that originate from utility meters that are not on the read list 310 may be dropped without being forwarded to the utility service provider 108. In an alternative embodiment, a "black" list (not illustrated) is created and stored in the memory 302. As such, packets that originate from utility meters on the black list may be dropped in this alternative embodiment.

Figure 4:
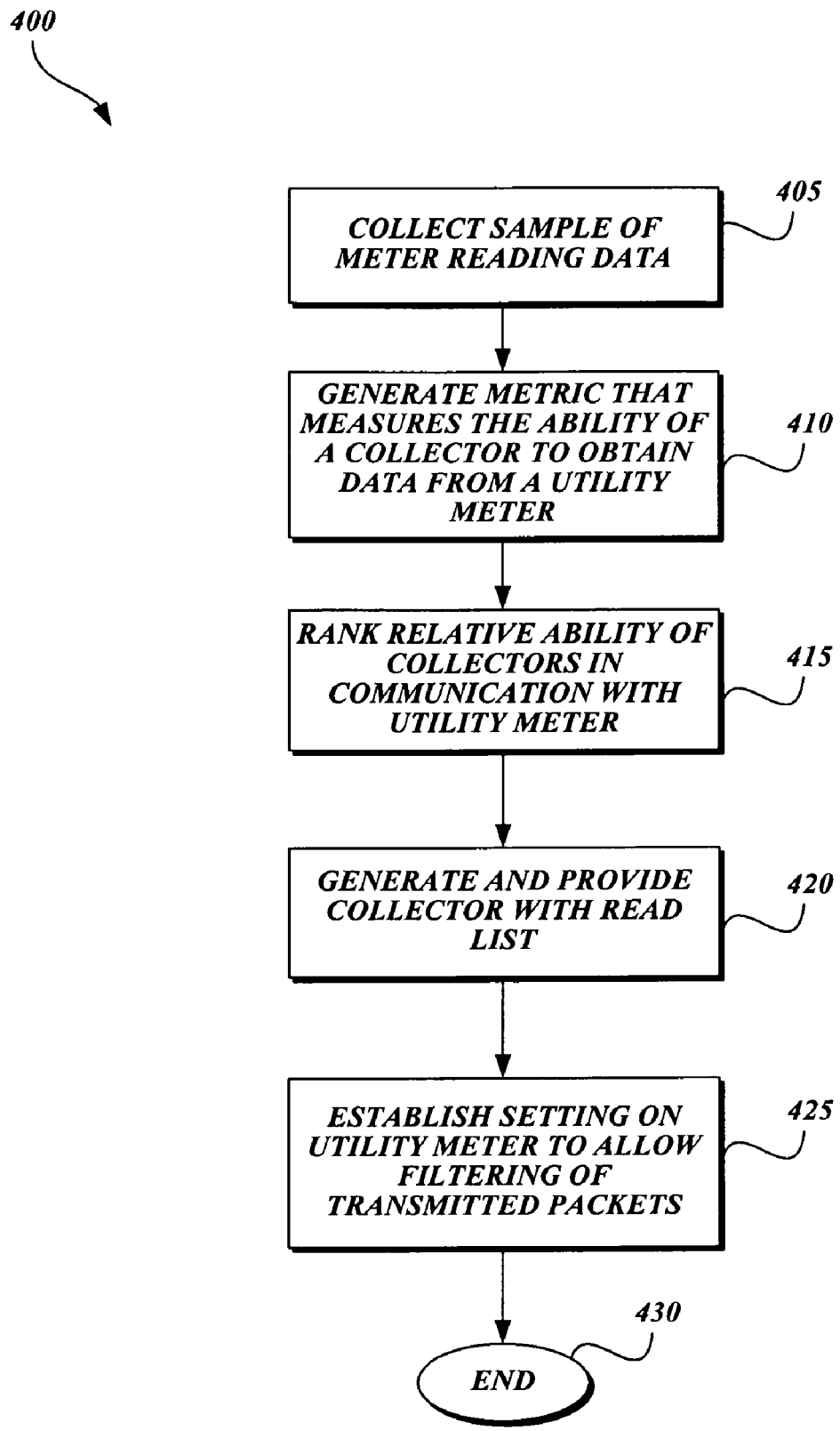
FIG. 4 is a flow diagram of one exemplary routine for filtering meter reading data.

Now, with reference to FIG. 4, one representative embodiment of a filtering routine 400, suitable for being implemented in the metering environment 100 depicted in FIG. 1, is provided. As depicted in FIG. 4, the filtering routine 400 begins at block 405 where a sample of meter reading data is collected. In this regard, collectors with potentially overlapping coverage areas may be used to collect the sample. By way of another example, a mobile control unit (e.g., utility vehicle) configured with a radio transceiver may be used to collect a sample of meter reading data, at block 405. Moreover, those skilled in the art and others will recognize that meter reading data may be collected utilizing other systems (e.g., mesh/micro networks, handheld devices, Telephone-Base, etc.) and the examples provided herein should be construed as exemplary.

At block 410 of the filtering routine 400, a metric is generated that measures the ability of a collector to collect data from a particular utility meter. As mentioned previously, the utility service provider 108 maintains the host servers 110 with associated application logic for managing and aggregating the collection of data in a metering environment. To facilitate billings and monitor the performance of the metering infrastructure, the host servers 110 are configured to process meter reading data in a variety of ways. At block 410, a metric known as a "read coefficient" may be generated that quantifies the number of meter readings successfully obtained by a collector from a particular utility meter. As mentioned above, utility meters may be configured to transmit meter reading data at known intervals. Since the total number of meter readings transmitted over the sample time period is known, the read coefficient may be readily generated by comparing the packets successfully obtained by a collector with the total number of packets transmitted from a utility meter. However, those skilled in the art and others will recognize that the ability of the collectors 102-106 to communicate with a utility meter may be measured utilizing other factors such as, but not limited to, signal strength, interference measurements, and combinations thereof, etc. Accordingly, the exemplary utilization of a read coefficient should be construed as exemplary as the ability of a collector to obtain meter reading data may be measured, at block 410, in other ways without departing from the scope of the claimed subject matter.

At block 415 of the filtering routine 400, a ranking that assesses the relative ability of two or more collectors to communicate with the same utility meter is generated. In this regard, the metric quantified at block 410 may be used to rank the ability of collectors to communicate with the same utility meter. Accordingly, collectors that received higher read coefficients, as a result of successfully collecting a higher percentage of meter readings during the sample period, will be ranked higher than collectors associated with lower read coefficients.

At block 420 of the filtering routine 400, a read list is generated identifying utility meters from which meter reading data will be forwarded by a collector. As mentioned previously, a read list 310 allows a collector 102 to differentiate between meter reading data that will be forwarded to a utility service provider 108 from meter reading data that will be "dropped." The creation of the read list 310 may be based on rankings that assess the relative ability of a plurality of collectors to communicate with the same utility meter (generated at block 415). In one embodiment, a predetermined number of collectors (e.g., 3) that are ranked the highest in their ability to communicate with a utility meter will be configured to forward meter reading data received from a utility meter. In this regard, the number of collectors that are allowed to forward meter reading data is configurable and may depend on network and device variables that make a particular configuration preferable over another. In this way, aspects of the disclosed subject matter are able to provide a fault-tolerant metering infrastructure while still allowing the expenditure of network resources to be minimized.

At block 425 of the filtering routine 400, settings of a utility meter are established to allow filtering of transmitted packets. The disclosed subject matter may be implemented in the context of a metering infrastructure in which a utility meter may be re-configured based on a received command. In one aspect, existing metering protocols are extended so that a collector may generate a command to modify the value of the network configuration bytes field 210 or 260 of packets being transmitted from a utility meter. For example, a collector identified as being the highest ranked in communicating with a utility meter may generate and transmit a command to establish the value of the network configuration bytes field 208 or 258 that will be transmitted from a utility meter. Then, the filtering routine 400 proceeds to block 430, where it terminates. Once the filtering routine 400 has been performed, the utility meters 114-130 will be configured to encode and transmit packets in a way that allows the collectors 102-106 to filter received meter reading data. Collectors identified as being the most reliable in communicating with a particular utility meter will forward data originating from the utility meter to a service provider. In contrast, lower-ranked collectors will not forward data originating from the utility meter, thereby conserving network resources.

It should be well understood that the filtering routine 400 described above with reference to FIG. 4 does not show all of the functions performed within the metering environment 100 depicted in FIG. 1. Instead, the filtering routine 400 describes the commands and data exchanges performed in order to filter data originating from utility meters. Those skilled in the art and others will recognize that some functions and/or exchanges of data described above may be performed in a different order, omitted/added, or otherwise varied without departing from the scope of the claimed subject matter. For example, the filtering routine 400 provided above with reference to FIG. 4 describes the embodiment where a "read" list is created to filter meter readings. However, in alternative embodiments, a "black" list may be created and used to filter meter readings without departing from the scope of the claimed subject matter.

Figure 5:
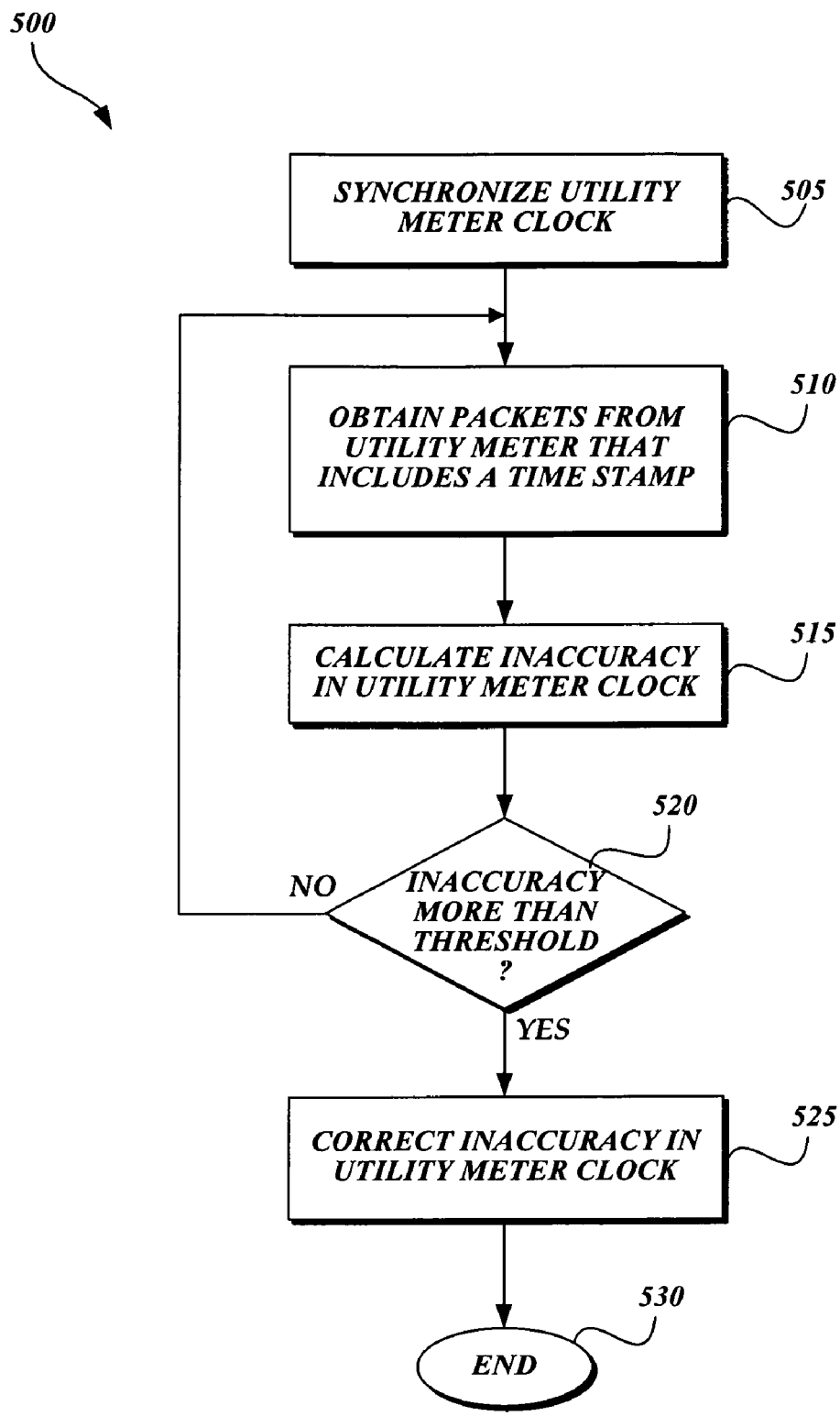
FIG. 5 is a flow diagram of one exemplary routine for performing an analysis of the time maintained by a utility meter.

Now with reference to FIG. 5, one representative embodiment of a timing routine 500 will be described that determines whether the time maintained by a utility meter is within tolerable error limits. As depicted in FIG. 5, the timing routine 500 begins at block 505 where a low-power clock maintained by a utility meter is synchronized with a more accurate clock. As mentioned above, the time maintained by a utility meter may be less reliable and have at least some tendency to drift from the actual time. In contrast, a collector (e.g., CCU) does not have the same power restrictions as utility meters and may be configured with a more accurate clock 304. In one embodiment, existing systems allow the clock 304 of the collector 102 to be synchronized with a very accurate time utilizing Global Positioning Systems ("GPS"). Alternatively or as a backup, the clock 304 of the collector 102 may be synchronized to devices coupled to the wide area network 112 utilizing the Network Time Protocol ("NTP"). However, those skilled in the art will recognize that the time maintained by the clock 304 may be synchronized in other ways without departing from the scope of the claimed subject matter. In addition, the time maintained by the collector 102 may be synchronized with a utility meter, at block 505. However, to conserve power and minimize the consumption of network resources, synchronization of the clock in a utility meter with a known accurate time of a collector may be performed as needed based on a predetermined amount of projected "drift" in the utility meter clock, on a periodic basis, and the like.

At block 510 of the timing routine 500, one or more packets originating from a utility meter are collected. As mentioned previously, an existing metering infrastructure may be used to collect packets originating from a utility meter that contains a time stamp. For example, the packets 200 and 250 (FIGS. 2A-B) maintain the time since midnight fields 210 or 260 that provide a time stamp since the most recent synchronization with a known accurate time. Accordingly, in obtaining meter reading data, collectors also obtain a time stamp from which the accuracy of a utility meter clock may be measured. Those skilled in the art will recognize that the time since midnight is merely one exemplary time in which data may be recorded. In alternative embodiments, the time stamp included in the packet is from a different reference point, maintains a shorter/longer time interval, etc.

As further illustrated in FIG. 5, the inaccuracy in the time maintained by a utility meter is calculated, at block 515. Specifically, the value in the time since midnight fields 210 or 260 of one or more received packets may be compared to the time maintained by a collector. In this regard, calculating the inaccuracy of a utility meter clock may include identifying a percentage difference between the more accurate time maintained by a collector and the time stamp value represented in a received packet. Moreover, the calculations performed at block 515 may also include aggregating and normalizing a plurality of time stamps from multiple packets. In this regard, those skilled in the art and others will recognize that the inaccuracy of a utility meter clock may be calculated in other ways without departing from the scope of the claimed subject matter.

At decision block 520, a determination is made regarding whether the inaccuracy in a utility meter clock is greater than a predetermined error threshold. In this regard, an error threshold may be established so that inaccuracies rising to a certain percentage (e.g., 5%) from any given interval will satisfy the threshold. In addition, error thresholds may be based on systematic inaccuracies observed over multiple intervals. In any event, if an inaccuracy in a utility meter clock does not satisfy the error threshold, then the result of the test performed at block 520 is "no" and the timing routine 500 proceeds back to block 510. Conversely, if an error threshold is satisfied, the result of the test performed at block 520 is "yes" and the timing routine 500 proceeds to block 525. Then, at block 525, action is performed to correct the inaccuracy in a utility meter clock. In this regard, the corrective action taken at block 525 may include having utility service personnel replace a component of a utility meter. In addition or alternatively, the corrective action may include resetting a utility meter clock and/or propagating a software update that compensates for the inaccuracy. Then, once the corrective action to the utility meter clock has been implemented, the timing routine 500 proceeds to block 530 where it terminates.

While embodiments of the claimed subject matter have been illustrated and described, it will be appreciated that various changes can be made therein without departing from the spirit and scope of the present disclosure.

The embodiments of the invention in which an exclusive property or privilege is claimed are defined as follows:

1. In a metering environment that includes a plurality of collectors and a utility meter, a method of filtering data that is transmitted from the utility meter, comprising:
    ranking the relative ability of the plurality of collectors to capture transmissions from the utility meter;
    based on the relative ranking, identifying at least one collector from the plurality of collectors that will be configured to disregard transmissions that originate from the utility meter; and
    providing the at least one collector with network configuration information for differentiating between transmissions containing data that will be forwarded to a utility service provider from transmissions that originate from the utility meter.

2. The method as recited in claim 1, further composing:
    at the at least one collector, obtaining a transmission that includes a packet; and
    comparing the network configuration represented in the received packet with the network configuration provided to the at least one collector to determine whether the packet contains meter reading data being reported by the utility meter.

3. The method as recited in claim 1, wherein ranking the relative ability of the plurality of collectors to capture transmissions from the utility meter, includes:
    using the plurality of collectors to obtain a sample set of transmissions from the utility meter; and generating a metric that measures the ability of the at least one collector to obtain transmissions from the utility meter.

4. The method as recited in claim 3, wherein using the plurality of collectors to obtain a sample set of transmissions from the utility meter includes causing data obtained by the plurality of collectors to be aggregated at a central location.

5. The method as recited in claim 3, wherein generating a metric includes calculating a read coefficient that quantifies the number of transmissions obtained by the at least one collector relative to the total number of packets broadcast by the utility meter in the sample.

6. The method as recited in claim 1, wherein identifying at least one collector that will be configured to disregard transmissions that originate from the utility meter includes causing the value of network configuration information in packets originating from the utility meter to be modified.

7. A system for filtering meter reading data that is transmitted to a utility service provider, the system comprising:
- a utility meter configured to encode and transmit packets that include a network configuration associated with the utility meter;
- a host server operative to obtain a sample of meter reading data originating from the utility meter and define a network configuration for at least one collector to disregard packets that originate from the utility meter; and
- a collector configured to obtain a packet transmitted by the utility meter and compare the network configuration represented in a received packet with the network configuration defined by the host server to determine whether to collect meter reading data in the received packet.

8. The system as recited in claim 7, wherein the collector is further configured to utilize the two-way communication ability of the utility meter to modify the value of network configuration information included in packets that are transmitted by the utility meter.

9. The system as recited in claim 7, wherein the host server is further configured to rank the relative ability of a plurality of collectors to capture packets transmitted by the utility meter.

10. The system as recited in claim 7, further comprising a second utility meter wherein the host server is further configured to define a network configuration for the collector to listen for packets that originate from the second utility meter and the collector is further configured to forward meter reading data received from the second utility meter to the host server.

11. A collector configured to filter meter reading data having instructions that, when executed by a processor, causes the collector to:
- accept a network configuration to disregard packets originating from a first utility meter;
- receive a packet that includes a representation of a network configuration associated with a utility meter that encoded the packet;
- compare the network configuration represented in the packet with the network configuration of the collector; and
- if the result of the comparison indicates that the packet originated from the first utility meter, prevent meter reading data encoded in the packet from being forwarded to a remote device.

12. The collector as recited in claim 11, wherein the collector is further configured to accept a network configuration to listen for packets originating from a second utility meter and wherein if the result of the comparison indicates that the packet originated from the second utility meter, the collector is further configured to forward meter reading data in the packet to the remote device.

13. The collector as recited in claim 12, wherein to accept a network configuration to listen for packets originating from a second utility meter includes utilizing the two-way communication ability of the second utility meter to modify the network configuration information represented in packets encoded by the second utility meter.

14. The collector as recited in claim 12, wherein to forward meter reading data in the packet includes aggregating meter reading data received from multiple utility meters and converting the aggregated data into a format accepted by a utility service provider.

15. The collector as recited in claim 11, wherein the network configuration accepted by the collector is defined based on the relative ability of a plurality of collectors to capture packets originating from the first utility meter.

16. The collector as recited in claim 15, wherein to define the network configuration of the collector includes calculating a metric that measures the ability of the collector to obtain packets from the first utility meter.

* * * * *